United States Patent [19]

Schnell et al.

[11] Patent Number: 4,874,905
[45] Date of Patent: Oct. 17, 1989

[54] CABLE CLAMPS FOR ELECTRICAL BOX

[75] Inventors: Kenneth R. Schnell; Gregory J. Kesler, both of South Bend, Ind.

[73] Assignee: Hubbell Incorporated, Orange, Conn.

[21] Appl. No.: 264,877

[22] Filed: Oct. 31, 1988

[51] Int. Cl.$^4$ ............... H02G 3/08; H02G 15/007
[52] U.S. Cl. .................................................. 174/65 R
[58] Field of Search ................ 174/65 R; 220/3.2; 439/470, 472

[56] References Cited

U.S. PATENT DOCUMENTS

| | | | |
|---|---|---|---|
| 3,112,938 | 12/1963 | Karlin | 285/128 |
| 4,277,641 | 0/1981 | Bauer et al. | 174/65 R |
| 4,304,958 | 12/1981 | Neff et al. | 174/65 R |
| 4,306,109 | 12/1981 | Nattel | 174/65 R |
| 4,316,999 | 2/1982 | Nattel | 174/65 R |
| 4,436,952 | 3/1984 | Lockwood | 174/65 R |
| 4,591,658 | 0/1986 | Bauer et al. | 174/65 R |
| 4,605,816 | 8/1986 | Jorgensen et al. | 174/65 R |

Primary Examiner—Leo P. Picard
Assistant Examiner—David A. Tone
Attorney, Agent, or Firm—Jerry M. Presson; Walter C. Farley

[57] ABSTRACT

An electrical ceiling box has an entrance port which is substantially closed by a cable clamp including an elongated tab hingedly connected at one end to a wall of the box. Near the other end of the tab is an arcuate wall extending from the inner surface of the tab. The wall has a concave surface facing toward the distal end of the tab. The concave surface is shaped and dimensioned to receive the end of a finger so that the installer can engage the tab to swing into the box and insert a cable through the port. At the base of the concave surface is a recess shaped and dimensioned to receive the end of a screwdriver blade to allow a screwdriver to be used for opening the port.

3 Claims, 4 Drawing Sheets

CABLE CLAMPS FOR ELECTRICAL BOX

SPECIFICATION

This invention relates to cable clamps for an electrical box and, particularly, to means for facilitating engaging and opening the clamps to permit cable access.

BACKGROUND OF THE INVENTION

It is conventional to provide electrical boxes with knockouts or with cable clamps, or both, to permit the entry of cable into the box under various circumstances. Generally speaking, such cable clamps extend across a port through which cable can be passed, each clamp being hinged at one end so that it can be swung inwardly into the interior volume of the box to open the port and thereby permit entry of the cable. The clamp can be provided with serrations or teeth to engage the outer insulation on the cable and prevent its inadvertent extraction.

While such a box is built to permit this hinging action, there is intentionally some resistance to swinging the clamp inwardly, at least the first time, so that an unused clamp will maintain a reasonably secure closure for its associated port. When the box is particularly deep as compared with the cross sectional area of its open side, getting a grip on the clamp, particularly if the box has already been installed in a wall, ceiling or the like, can be somewhat difficult and may require a special tool of some kind.

SUMMARY OF THE INVENTION

An object of the present invention is to provide a cable clamp having means to facilitate engagement thereof, by either the finger of a person installing the cable or by the flat blade of a conventional screwdriver to make the process of opening the clamp significantly easier.

Briefly described, the invention comprises a cable clamp for an electrical box of the type having means defining an entrance port for an electrical cable comprising an elongated tab extending across and substantially closing the entrance port At one end of the tab is hinge means connecting the tab to the box to permit the tab to be swung into the box and away from the port so that a cable can be inserted therethrough. An arcuately curved wall is formed on an inner surface of the tab, the curved wall having a concave surface facing generally toward the distal end of the tab and being dimensioned to receive the end of a finger to facilitate swinging the tab into the box.

The cable clamp further comprises a recess at the base of the concave surface of the wall shaped and dimensioned to receive the end of a tool such as a blade screwdriver to facilitate the use of a screwdriver to swing the cable clamp into the box.

BRIEF DESCRIPTION OF THE DRAWINGS

In order to impart full understanding of the manner in which the foregoing and other objects are attained in accordance with the invention, a particularly advantageous embodiment of the invention will be described with reference to the accompanying drawings, which form a part of this specification, and wherein.

DESCRIPTION OF THE PREFERRED EMBODIMENT

Figure 1:
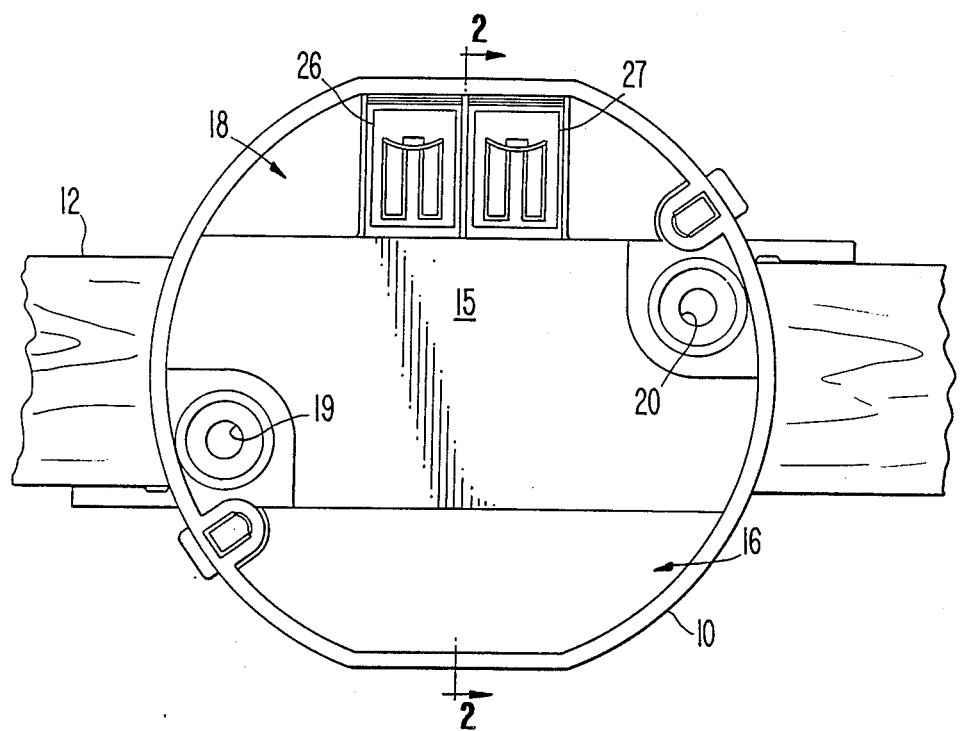
Fig. 1 a bottom plan view of a ceiling box incorporating cable clamps in accordance with the present invention, the box being shown mounted to a ceiling joints.
Figure 2:
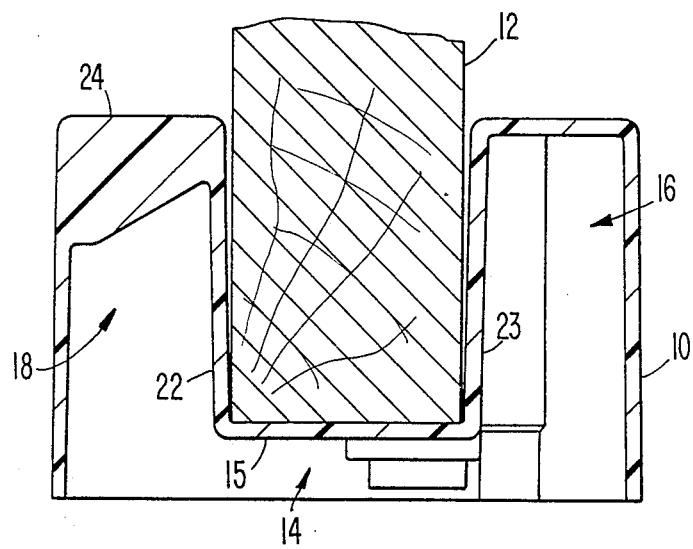
FIG. 2 is a sectional view along line 2—2 of Fig. 1.
Figure 3:
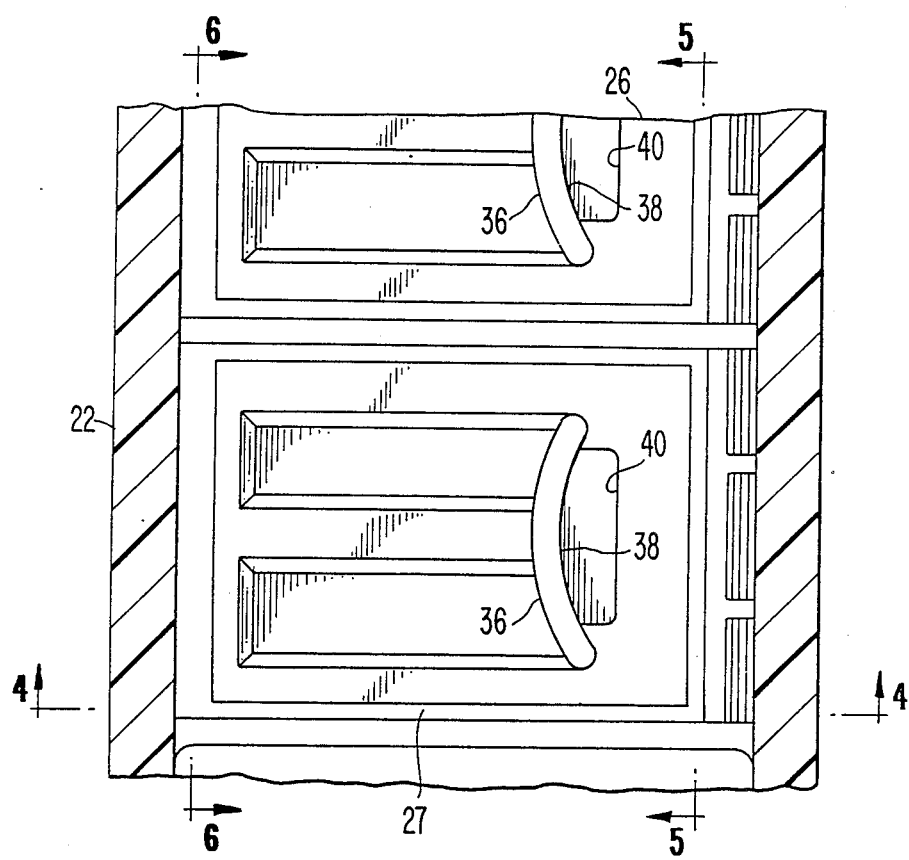
FIG. 3 is, an enlarged plan view, in partial section, of the clamp structure in the box of FIG. 1.
Figure 4:
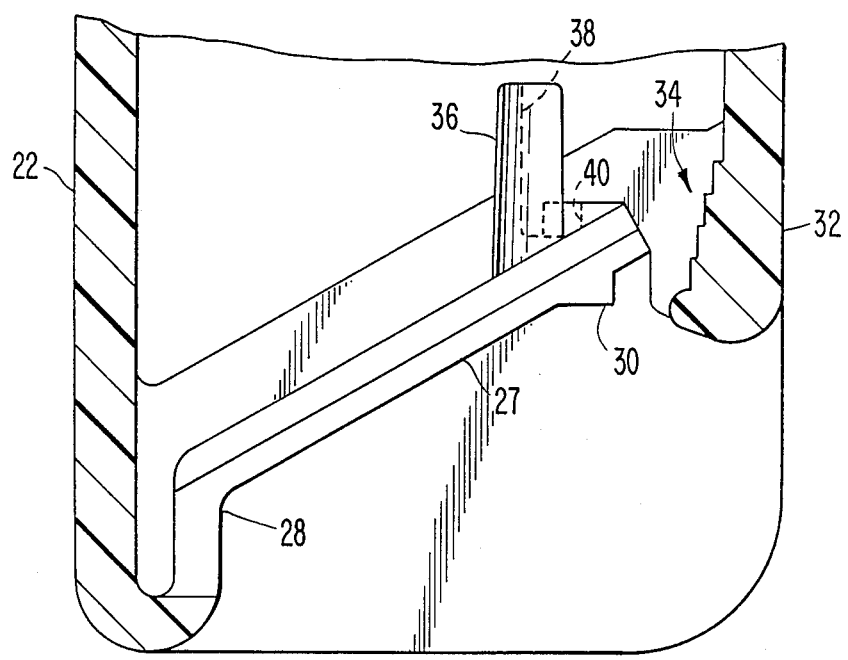
FIG. 4 is a side elevation, in partial section, along line 4-4 of FIG. 3.
Figure 5:
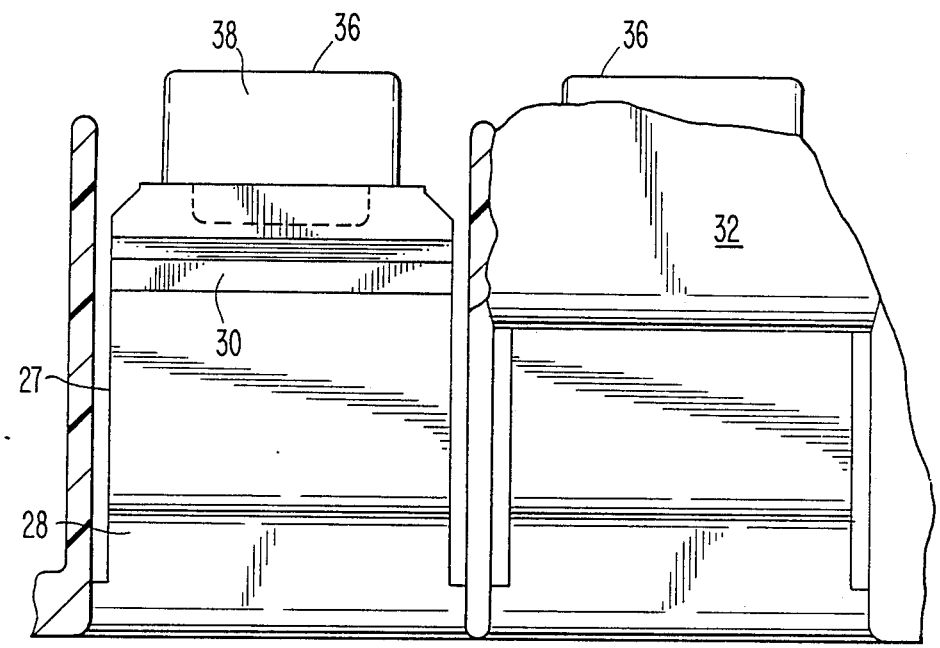
FIG. 5 is an end elevation along line 5—5 of Fig. 3.
Figure 6:
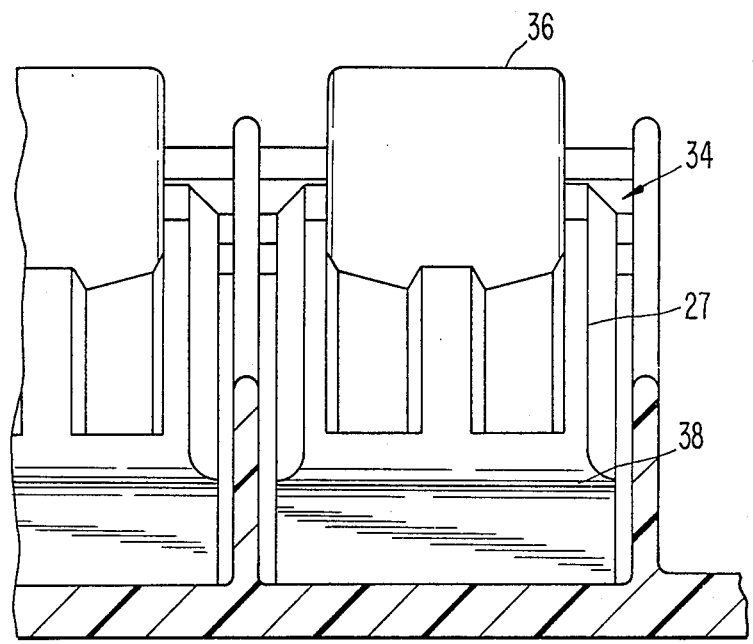
FIG. 6 is an opposite end elevation along line 6—6 of FIG. 3.

As seen in FIGS. 1 and 2, the ceiling box 10 in which the clamps of the present invention are formed is a generally circular box which is mounted on a ceiling joist 12. Box 10 is formed with a central shallow chamber 14 and side chambers 16 and 18 which are considerably deeper and which lie on opposite sides of joist 12. Central chamber 14 has a back wall 15 which rests against the lower edge of joist 12 and which is penetrated by openings 19 and 20 through which screws or nails can be inserted into the joist to secure the box in its appropriate position. Inner walls 22 and 23 extend upwardly from wall 15 on opposite sides of joist 12 and define the inner portions of deep chambers 18 and 16, respectively.

Chamber 18 has a rear or upper wall 24 with clamps 26 and 27 formed therein, the clamps being shown in greater detail in FIGS. 3-6. As shown therein, each clamp comprises an elongated, generally rectangular tab 27 having a hinge portion 28 at one end, joining the tab to a wall of the box. At the distal end of each tab is a downwardly and outwardly protruding tooth 30 for engaging a cable inserted through the access port. A wall portion 32 opposite the distal end of the tab is formed with a plurality of steps or serrations 34 which also engage the cable and cooperate with tooth 30.

The sides and/or the unhinged, distal end of tab 27 can be joined, preferably at spaced locations, to the adjacent barriers or walls of the box so that a tab will constitute a substantially complete closure of its associated part until it is to be used, somewhat in the manner of a knockout. Thus, when a specific port is to be used for the first time, its associated tab must be broken loose along the attached sides (except, of course, for the hinged end) which requires significant force. If the box is unmounted such that the tab can be reached from the outside, this presents no problem at all. However, if it is already mounted, as is usually the case, the outside is not accessible and the force must be applied from within the box.

On the opposite surface of the tab near the distal end thereof is an upstanding wall 36 having an arcuate surface 38 which is shaped and dimensioned to easily accommodate the end of a finger This surface is concave in the direction toward the distal end of the tab and generally faces serrations 34.

Figure 7:
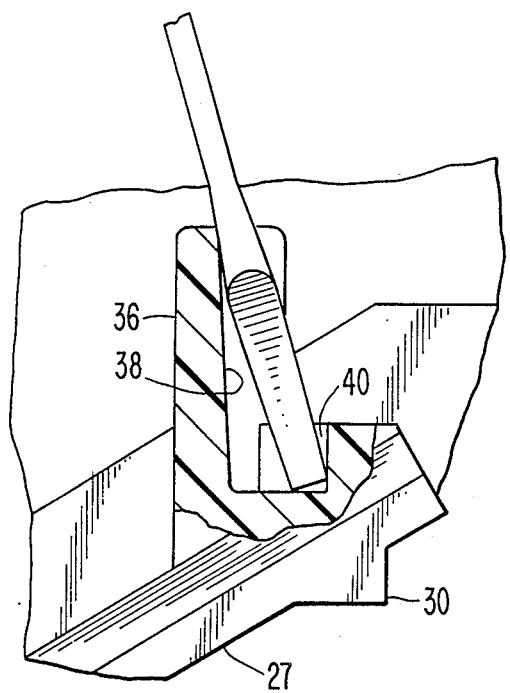
Fig. 7 is a partial side elevation in partial section of the clamp with a screwdriver in operative position.

At the base of surface 34 is a generally rectangular recess or pocket 40 which is shaped and dimensioned to receive the tip of the blade of a tool such as a conventional blade screwdriver, providing an optional additional technique for swinging the tab inwardly toward the box. The location of recess 40 permits one to apply some leverage to the tab if it should be particularly difficult to move. This leverage is applied by placing the tip of the blade in recess 40 and urging an upper portion of the blade against the upper edge of surface 38 as best seen in FIG. 7, using the upper edge as a fulcrum and creating a torque about the hinged portion of the tab which increases the amount of force which can be applied thereto.

As will be recognized, not only does the wall 36 with its finger-engaging surface 38 and the recess 40 provide an additional convenience for the installer but, in a box of the type shown in FIGS. 1 and 2, these aids are essential because of the depth of chamber 18. If the box is already installed on a joist, the depth and narrowness of the chamber, although advantageous for wiring purposes, makes it more difficult to reach the cable clamps. Being able to insert a finger or a simple tool such as a screwdriver to open the clamps is therefore of considerable importance.

While one advantageous embodiment have been chosen to illustrate the invention, it will be recognized by those skilled in the art that various changes and modifications can be made therein without departing from the scope of the appended claims.

What is claimed is:

1. An electrical ceiling box and cable clamp structure, the ceiling box being of the type having means defining an entrance port for an electrical cable, the structure comprising an elongated tab extending across and substantially closing said entrance port;

hinge means at the proximal end of said tab connecting said tab to said box to permit said tab to be hingedly swung into said box and away from said port so that a cable can be inserted through said port and into said box;

an arcuately curved wall formed on an inner surface of said tab near the distal end of said tab, said curved wall having a concave surface facing generally toward said tab distal end of said tab and being dimensioned to receive the end of a finger to facilitate swinging said tab into said box; and means defining a recess at the base of said concave surface of said wall, said recess being shaped and dimensioned to receive the end of a blade screwdriver to facilitate the use of a blade screwdriver to swing said tab into said box.

2. A structure according to claim 1 wherein said tab further comprises a tooth formed on an outer surface of said tab near said distal end to engage an outer surface of a cable inserted through said port.

3. A structure according to claim 2 wherein said cable clamp further includes means on a box wall opposite said distal end including teeth for cooperating with said tooth on said tab to engage said cable.

* * * * *